3,322,267
MULTIPLE-CAVITY COOKIE CONTAINER
Hugh R. Weiss, Montclair, N.J., assignor to The Pantasote Company of New York, Inc., New York, N.Y., a corporation of New York
Filed June 12, 1964, Ser. No. 374,636
4 Claims. (Cl. 206—65)

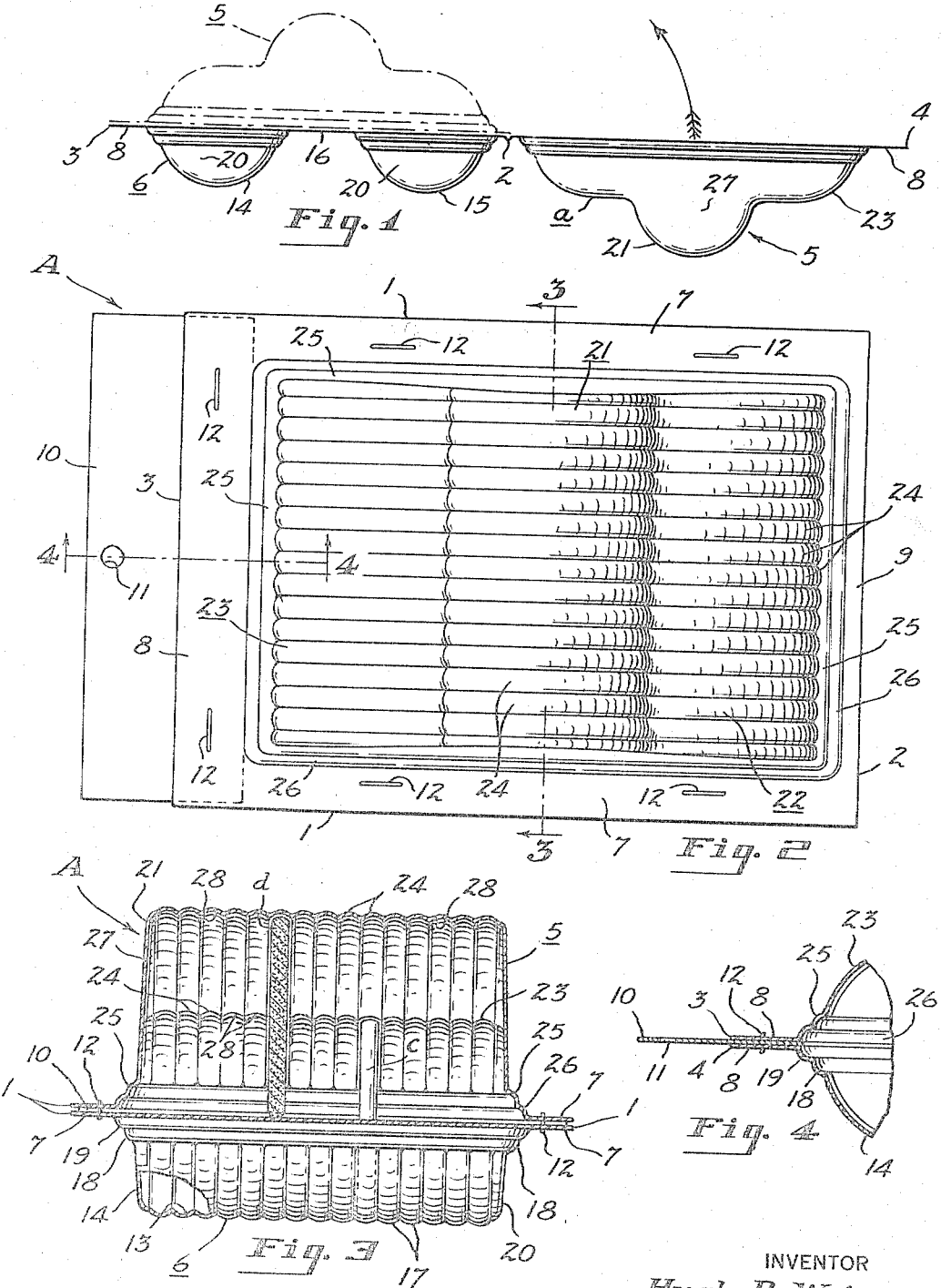

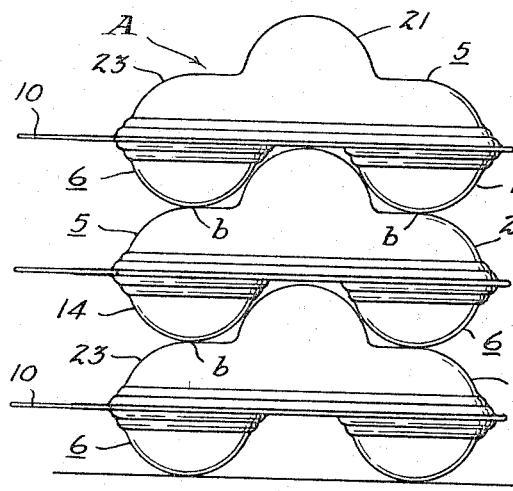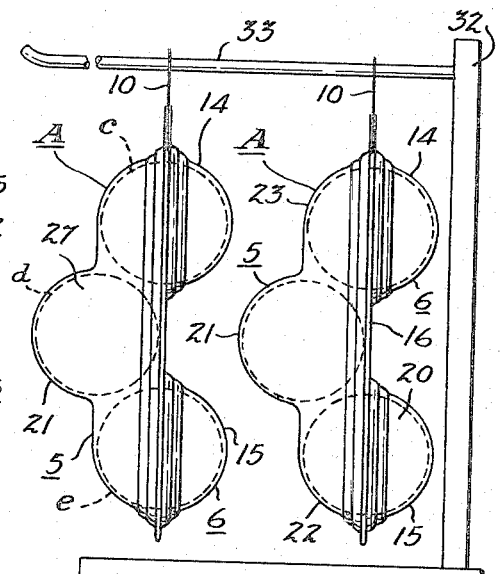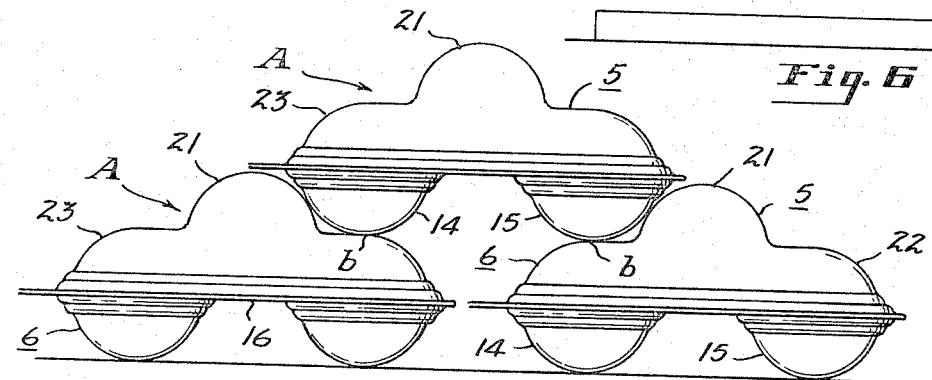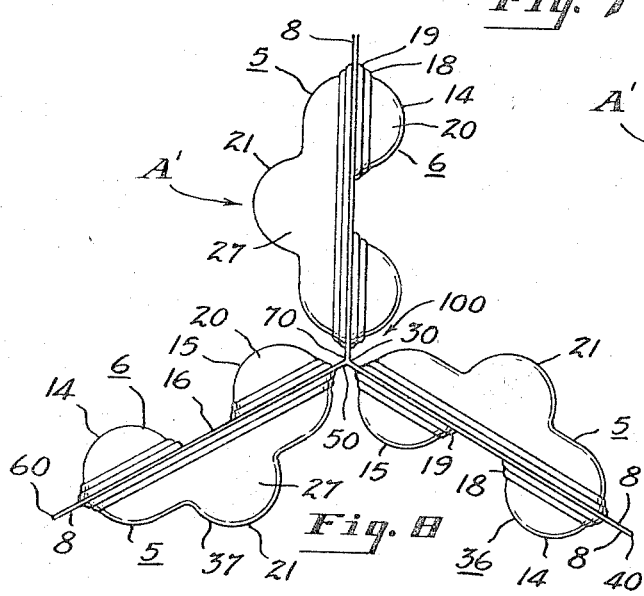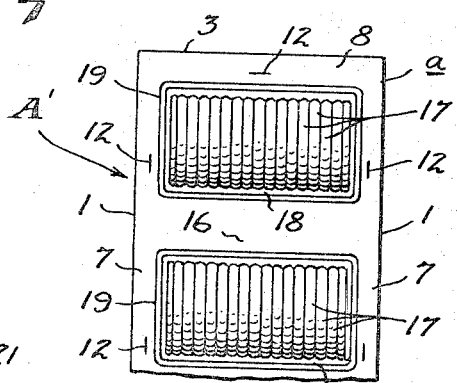
May 30, 1967 H. R. WEISS 3,322,267
MULTIPLE-CAVITY COOKIE CONTAINER
Filed June 12, 1964 2 Sheets-Sheet 2
INVENTOR
Hugh R. Weiss United States Patent Office 3,322,267
Patented May 30, 1967

The present invention relates to hinged one-piece plastic wafer containers for cookies, confections or various fragile disc-shaped articles and more particularly to a strong offset three-row wafer container which holds the individual wafers in place and which interlocks with other containers when stacked on a shelf to prevent accidental sliding from the stack.

The novel wafer container of this invention is formed from a single sheet of a transparent synthetic material, such as a vinyl resin, which is folded back upon itself to provide a closed receptacle for three rows of cookies or the like having upper and lower halves with corrugations or the like engaging the cookies to hold them in place. The transparent material permits visual inspection at any time and also provides the cookies with adequate protection against damage during handling.

Heretofore molded plastic containers with rounded or semi-cylindrical surfaces were much more difficult to handle than standard rectangular boxes or cartons because of the slippery plastic surfaces, the reduced area of contact with the supporting surface, and the difficulty involved in stacking or storing the containers. For this reason, rectangular boxes were often preferred for storing fragile articles such as cookies. The rounded plastic containers were considered unsafe for stacking because they readily slid off of the stack.

The present invention overcomes the above difficulties by offsetting three rows of wafers in the container and shaping the bottom half of each container so that it interlocks with the upper half of an underlying container when the containers are stacked on a counter or shelf. The bottom containers will not slide on the shelf because of the weight of the overlying containers, and the upper containers are locked against sliding movement.

The locking action is obtained by locating the three parallel rows of wafers with their marginal edges adjacent one another and with the central row offset from the plane containing the axes of the outer rows a ditsance preferably about equal to the radius of each wafer and by shaping the upper half of the container so that it fits the lower half of an identical overlying container. The unusual shape might seem to be impractical and undesirable because it increases the depth of the container about 50 percent, but it is nevertheless desirable because it does not increase the amount of space required to store a large number of such containers. The unusual shape permits use of automatic loading procedures and actually increases the strength of the container, particularly because of the unusual shape of the end walls.

An object of the invention is to provide a plastic cookie container which will not slide when stacked on a grocery counter.

A further object of the present invention is to provide a transparent container for cookies which effectively protects the cookies against breakage.

Another object of the invention is to provide a rounded plastic container which permits stacking of a maximum number of cookies in a space of minimum size.

A still further object of the invention is to increase the strength of plastic cookie containers.

Other objects, uses and advantages of the present invention will become apparent to those skilled in the art from the following description and claims and from the drawings, in which like parts are identified by the same numerals throughout the several views.

In the drawings:

FIGURE 1 is a side elevational view on a reduced scale showing a molded plastic sheet made according to this invention, one half of the sheet being shown in dot-dash lines in its position when the sheet is folded back upon itself to form a cookie container;

FIGURE 2 is a top plan view of a completed 3-row wafer container made according to this invention with the cookies omitted;

FIGURE 3 is a transverse vertical sectional view taken on the line 3—3 of FIGURE 2 and on the same scale, two cookies being shown mounted in the tray;

FIGURE 4 is a fragmentary longitudinal vertical sectional view taken on the line 4—4 of FIGURE 2 with the cookies omitted;

FIGURE 5 is a side elevational view on a reduced scale showing how the container of FIGURES 1 to 4 may be stacked;

FIGURE 6 is a side elevational view showing two of the wafer containers hung on a hook, the wafers being shown in dotted lines;

FIGURE 7 is a side elevational view showing another stacking arrangement employing the wafer container of this invention;

FIGURE 8 is an end elevational view on a reduced scale showing another modified form of wafer container made from the same plastic sheet used to make the container of FIGURES 1 to 4; and FIGURE 9 is a fragmentary side elevational view of the 9-compartment wafer container viewed from the right of FIGURE 8.

Referring more particularly to the drawings, which are drawn substantially to scale (except for the thickness of the material), FIGURE 1 shows a portion of a thin transparent sheet $a$ of polyvinyl chloride, polystyrene or other suitable thermoplastic material which has a uniform width and straight parallel side edges 1 extending the full length of the sheet. The sheet $a$ has a uniform thickness of at least 0.002 and preferably 0.005 to 0.02 inch prior to the molding operation which may be performed, for example, using a machine of the general type described in U.S. Patent No. 2,902,718.

When the sheet $a$ is used to form the wafer container A, it is cut to provide straight end edges 3 and 4 perpendicular to the side edges 1. Midway between the end edges 3 and 4, the sheet $a$ is molded to form a straight grooved or hinged portion 2 parallel to the edges 3 and 4 and extending the full width of the sheet. This hinge facilitates folding the sheet $a$ back upon itself so that the top half 5 engages the bottom half 6 generally as shown in dot-dash lines in FIGURE 1.

The part 5 and 6 are shaped to fit together so as to provide a closed wafer container having compartments for three parallel rows of cookies or other disc-shaped articles. The sheet $a$ is molded without disturbing the side and end portions of the sheet so as to provide narrow flat side portions 7 and narrow flat end portions 8. If desired, a narrow, flat portion 9 may be provided on opposite sides of the hinge 2, but such portion is not essential. The portions 7, 8 and 9 thus form the margin of the container and surround the wafer-receiving compartments.

A handle 10, preferably in the form of a thin rectangular sheet of paper or suitable plastic material, may be provided to assist in lifting the cookie container or in hanging the container in a store. The handle may be provided with finger openings, but it is usually preferable to provide a central circular hole 11 so that the container can be hung on a rod or hook with other containers in a grocery store. Suitable means are provided for holding the flat side and end portions of the container $a$ in engagement so that the cookies in the container are clamped in place between the parts 5 and 6. As herein shown, a series of staples 12 are provided at the margin of the container, at least two of such staples preferably being provided to fasten the handle 10 between the flat portions 8. It is usually unnecessary to heat seal or tape the container at the edges 1, 3 and 4.

The bottom part 6 of the section of sheet *a* used to form each cookie container A has a pair of generally semi-cylindrical wall portions 14 and 15 and a relatively wide flat portion 16 having a width greater than the radius of curvature of said semi-cylindrical portions. The flat portion 16 extends the full distance between the side portions 7 and is preferably located substantially in the same plane as the portions 7, 8 and 9 to provide a ledge for supporting a central row of cookies, but it will be understood that the shape of the portion 16 may vary considerably. It is usually unnecessary to provide corrugations in the central part of the portion 16. Each of the semi-cylindrical portions 14 and 15 is preferably provided with corrugations or other wavy surfaces of revolution so as to provide a series of annular grooves for receiving the edges of circular cookies, and each of the portions 14 and 15 has a rectangular margin provided with decorative inner and outer marginal grooved portions 18 and 19 of uniform width near the plane of the side portions 7 and the end portions 8 and 9. As herein shown, each of the portions 14 and 15 has flat vertical semi-circular end walls 20 adjacent the flat surfaces of the cookies at the ends of the rows of cookies. Each row of cookies contains at least 5 and preferably 10 to 20 cookies, wafers, mints, or other disc-shaped frangible articles. The cookies or confections used in the container of this invention are preferably generally circular, but it will be apparent that the shape may vary somewhat. Also, two or more wafers may be joined together to provide a sandwich, and a series of such sandwiches may be mounted in each compartment of the tray.

The upper part 5 of each container A has a central generally semi-cylindrical portion 21 which projects outwardly from the side surface 7 a distance preferably equal to about twice its radius of curvature and which extends substantially the full distance between the side portions 7 of the part 5 as shown in FIGURES 2 and 3. The part 5 has generally flat end walls 27 which are substantially in alignment with the end walls 20 of the portions 14 and 15, the walls 27 being located adjacent the end cookies of all three rows to limit lateral movement thereof. If desired, the end walls 20 and 27 may be inclined somewhat as shown in FIGURE 3 to provide better protection for the cookies and to facilitate drawing of the sheet *a* during the vacuum forming operation.

The upper part 5 has a pair of rounded generally cylindrical portions 22 and 23 on opposite sides of the portion 21 and extending outwardly from said portion 21 and downwardly toward the hinge portion 2. The rounded part of each of the portions 22 and 23 is coaxial with the associated portion 14 or 15 of the bottom part 6 in the closed container, whereby the outer rows of wafers may be clamped between the corrugated surfaces of the parts 5 and 6 as shown in FIGURE 6. The generally semi-cylindrical portions 21, 22 and 23 are provided with continuous corrugations 24 which extend longitudinally parallel to the side edges 1 substantially from the portions 9 to the portions 8 as best shown in FIGURE 2. The corrugations 24 of the top part 5 are in alignment with the corrugations 17 of the portions 14 and 15 as shown in FIGURE 3, whereby each wafer is supported in a vertical position perpendicular to the walls 7 and 8 with its upper marginal edge located in one of the annular grooved portions 28 of the part 5 and with its lower marginal edge in a similar groove of the corrugations 17 as shown, for example, in FIGURE 3.

As herein shown, the rectangular margin of the large cavity between the end walls 27 and between the end portions 8 and 9 is provided with inner and outer decorative marginal grooved portions 25 and 26 of uniform width as best shown in FIGURES 2 and 3. Such portions have their long parts at the side portions 7 overlying the end parts of the portions 18 and 19 as shown in FIGURE 3 and have their short parts adjacent the portions 8 and 9 as overlying the longer parts of the portions 18 and 19 as shown in FIGURE 4. While advantages of the invention are obtained when the grooves at 18, 19, 25 and 26 are omitted, these grooves are preferred because they reinforce the container and provide better protection for the frangible wafers.

The container of the present invention is unusual, not only because it can be stacked safely, but also because it contains a large number of wafers and because the containers can be stored close together in a minimum amount of space. It will be noted that the generally cylindrical portions 14 and 15 are spaced apart a distance sufficient to receive the portion 21 of an identical container A when the containers are stacked and interlocked as shown in FIGURE 5. As shown in that figure, the lowermost surfaces of the portions 14 and 15 rest on the top surfaces of the portions 22 and 23 at the points *b*, the bottom surface of each upper container *a* being shaped between the points *b* to receive the upper portion 21 of the next lower container. If desired, the containers may be shaped to fit together so that the uppermost surface of the portion 21 engages the flat wall portion 16 of the container supported by that tray when the trays are stacked one above the other as in FIGURE 5; but a small clearance is usually provided between the upper surface of the wall portion 21 and the adjacent lower surface of the wall portion 16 of the next container.

Perhaps the most important advantage of the container A of this invention is that it may be stacked on a store counter or shelf with other containers A without danger of accidentally slipping out of the stack. It will be seen from FIGURE 5 that the central portion 21 of one container A is between and contiguous to or substantially in contact with both portions 14 and 15 of the overlying container while permitting surface contact of said portions 14 and 15 at points *b*. Thus, the portion 21 of one container interlocks with the overlying container to prevent horizontal movement of the overlying container. The generally cylindrical surface of the portion 21 prevents horizontal movement in a direction perpendicular to the axes of portions 14 and 15 due to engagement with the portions 14 and 15 and the corrugations 24 of portion 21 prevent horizontal movement in a direction parallel to said axes due to engagement with the corrugations 17. The containers A at the bottom of the stack need not be held against movement by special means because the weight of the stack provides adequate frictional resistance to sliding on ordinary flat counter tops. Because all of the containers in the stack above the bottom row are locked in place, the containers A are ideal for stacking in a grocery store.

In order to permit interlocking of the containers as in FIGURE 5, the generally cylindrical wall portions 14 and 15 are spaced apart a distance materially greater than the radius of curvature of the portion 21 or of the portions 14 and 15, and such distance is between 1.5 and 2 times the radius of each of the wall portions 14, 15 and 21. Although the portions 14 and 15 are spaced apart a substantial distance, the cookies or other wafers in the portions 14 and 15 have their edges at or adjacent to the edges of the wafers supported in the semi-cylindrical portion 21 as shown, for example, in FIGURE 6. It is often preferable to arrange the parts 5 and 6 so that each row of wafers is held out of contact with each adjacent row of wafers, but the amount of clearance between the two rows may be a very small fraction of an inch because the cookies are held against movement by the corrugated surfaces. The axes of the central row of cookies in the portion is preferably spaced from the plane containing the hinge 2 and the surfaces 7 and 8 a distance which is about equal to the radius of curvature of said portion 21. The bottom edges of the cookies in said central row engage the flat wall portion 16. Also the axes of the outer rows of cookies located at the portions 14 and 15 are located substantially at the plane containing the surfaces 7 and 8 and are spaced apart a distance greater than 3 times the radius of each cookie or 3 times the radius of each portion 14, 15 or 21. This will be apparent from the drawings, and such locations of the portions 14, 15 and 21 are necessary to obtain the most desirable stacking and interlocking features. Of course, the axes of the three rows of cookies are parallel to each other and to the hinge 2. Also, the cookies in the central row preferably have the same size and shape as the cookies in the outer rows, although this is not essential.

An important feature of the container A of this invention is the ability to clamp the cookies between the parts 5 and 6 so that each cookie in each of the three rows is held parallel to the next adjacent cookie and is held against movement so that the cookies are not broken by ordinary handling of the containers. The container of this invention thus provides maximum protection for the cookies. Also, the container of this invention facilitates loading of the containers by automatic machines and eliminates the necessity for individual paper wrappers for each row of cookies. Automatic loading, of course, permits substantial reduction in the cost of the cookie package.

One of the important advantages of the container A is its ability to fit another container when the containers are hung on rods or hooks as shown in FIGURE 6. In a grocery store, for example, a supporting wall 32, having a generally straight horizontal rod 33 may be used for displaying a large number of wafer containing containers A, each container being supported by the handle 10 after the rod 33 passes through the hole 11. Because of the unusual shape of the container A, it is possible to support a large number of such containers on each rod 33 in a space of minimum size (i.e., with the portions 14 and 15 of one container engaging the portions 22 and 23 of the next container).

As shown in FIGURE 6, each container A has three rows of cookies c, d and e, arranged with their axes parallel and spaced apart a distance greater than the diameter of the cookies so that there is a very small clearance between adjacent rows. The staples 12 hold the two parts 5 and 6 together so that the cookies are held in the grooves 13 and 28 of the upper and lower parts, whereby all of the cookies in each row are held in substantially parallel positions and the cookies do not strike each other during handling of the container. The cookies are thus provided with maximum protection while at the same time being stored in a minimum amount of space.

Another possible stacking arrangement is illustrated in FIGURE 7 of the drawings. It will be seen that the portions 14 and 15 of the upper container may engage the portions 22 and 23 of two different supporting containers at the points b. This pyramid type of stacking is sometimes desirable to provide a more attractive display. In this arrangement the containers A fit together in such a manner that each of the generally semi-cylindrical portions 14 and 15 of the upper container A is in engagement with the upper part 5 of a lower container at the point b and also is contiguous to or in engagement with the upper portion 21 of that lower container. Thus, the upper container is properly supported in the stack and is also locked in place so that it cannot slide off the stack accidentally.

It will be apparent, from the above, that the containers A may be stacked using only the vertical arrangement of FIGURE 5, using only the offset arrangement of FIGURE 7, or using various combinations of both arrangements. Thus, the bottom rows of a stack can employ the pyramid-type arrangement of FIGURE 7 while the upper rows of the stack employ the vertical arrangement of FIGURE 5. The number of different stacking arrangements which are possible is very large. In fact, the upper container of FIGURE 7 is well supported when turned upside down in the stack. All the arrangements have the advantage that the containers are interlocked and held against accidental sliding in the stack.

Another advantage of the unusual container A is that the end walls have substantially greater strength than could be obtained if the three rows of cookies were in alignment. The widening of the end wall 27 provides a structure more nearly resembling a triangle and having substantially more strength than a narrow generally rectangular end wall.

Instead of cutting the sheet a into one two-part section, the sheet may be cut to provide three 2-part sections 35, 36 and 37 as shown in FIGURE 8 and folded in an unusual manner so as to form a 9-row cookie container having a central hinge 100 and five integral hinged portions 30, 40, 50, 60 and 70 (of course, the latter hinged portions are cut off adjacent the flat portions 8 when forming the container A of FIGURES 1 to 4).

In forming the container A', the sheet a is cut in one very long piece containing the three parts 5 and three parts 6 of the integral sections 35, 36 and 37 and is then folded as shown in FIGURE 8 so that the three hinged portions 30, 50 and 70 are together at a central hinge line parallel to the hinges 40 and 60 and parallel to the outer edges 3 and 4 forming the edge of the section 35. The two parts of each of the sections are then connected together by the staples 12 in the side portions 7 and the end portions 8 to complete the assembly. The cookies are mounted in the trays before the stapling operation. It will be understood that the folding arrangement of FIGURE 8 may be employed with sections, each having less than three rows of cookies or a larger number of rows.

While the cookies or other wafers used in the container of this invention may be unwrapped, except for the container itself and/or marginal tapes or cellophane outer covers, it will be understood that the central row of all three rows of cookies may be wrapped in paper or in a transparent synthetic material before the cookies are placed in the corrugated compartments of the container.

It will be understood that, in accordance with the provisions of the patent statutes, variations and modifications of the specific containers disclosed herein may be made without departing from the spirit of the invention.

Having described my invention, I claim:

1. A stackable three-compartment container for packaging a multiplicity of generally circular articles of the same size comprising a single molded sheet of resinous material which may be folded back upon itself to provide two container halves of different shape that are united by an integral hinge and that fit together at the margin to define a closed container having three parallel axially-elongated compartments, the upper one of said two halves having a central generally semi-cylindrical wall portion which projects upwardly midway between the ends of the container and corrugated wall portions of lesser height on opposite sides of said central portion, said wall portions terminating in rounded trianguloidal end walls at opposite ends of the container, the lower one of said halves having two generally semi-cylindrical wall portions at opposite ends of the container which project downwardly and which have axes parallel to the axis of said first-named semi-cylindrical wall portion and spaced apart a distance greater than 3 times the radius of each of said wall portions such that, when two of such closed containers are stacked vertically, the bottom surfaces of both of the two downwardly projecting semi-cylindrical wall portions of one container engage and interlocked with the underlying container on opposite sides of the central upwardly projecting semi-cylindrical portion of said underlying container, each of said semi-cylindrical wall portions having corrugations with at least five annular grooves of a size to receive the marginal edge portions of said circular articles, said two halves being engageable with the top and bottom edge portions of said articles to hold them in place in three parallel rows when the container is closed.

2. A stackable three-compartment container as defined in claim 1 wherein a thin sheet is sandwiched between and connected to the end portions of said molded sheet remote from said hinge to provide a handle.

3. A stack comprising a series of superimposed three-compartment containers of the same size and shape for packaging a multiplicity of generally circular articles of the same size, each container comprising a single molded sheet of resinous material folded back upon itself to provide two container halves of different shape that are united by an integral hinge and that fit together at the margin to define a closed container having three parallel axially elongated compartments, the upper one of said two halves having a central generally semi-cylindrical wall portion which projects upwardly midway between the ends of the container and corrugated wall portions of lesser height on opposite sides of said central portion and terminating in rounded trianguloidal end walls at opposite ends of the container, the lower one of said halves having two generally semi-cylindrical wall portions at opposite ends of the container which project downwardly and which have axes parallel to the axis of said first-named semi-cylindrical wall portion, said axes being spaced apart a distance such that the bottom surfaces of both of the two downwardly projecting semi-cylindrical wall portions of one container engage and interlock with the underlying container on opposite sides of the central upwardly projecting wall portion of the underlying container, each of said semi-cylindrical wall portions having corrugations with at least five annular grooves to receive the marginal edge portions of said circular articles, the two halves of each container being engageable with the marginal edge portions of said articles to hold them in place in three parallel rows.

4. A combination as defined in claim 3 wherein a thin sheet is sandwiched between and connected to the end portions of the molded sheet forming each container remote from the hinge to provide a handle and wherein a series of said containers are suspended in alignment on a straight horizontal supporting rod extending through the handles.

References Cited
UNITED STATES PATENTS

| | | | |
|---|---|---|---|
| 1,173,114 | 2/1916 | Lane | 217—26.5 |
| 2,788,121 | 4/1957 | Ayres. | |
| 2,814,381 | 11/1957 | Stevick | 206—45.34 |
| 2,950,029 | 8/1960 | Winstead | 206—65 |
| 2,990,096 | 6/1961 | Crosby. | |
| 3,084,842 | 4/1963 | Beech | 217—26.5 X |
| 3,131,846 | 5/1964 | Whiteford | 229—2.5 |
| 3,164,478 | 1/1965 | Bostrom | 229—2.5 |
| 3,192,978 | 7/1965 | Horvath. | |

LOUIS G. MANCENE, *Primary Examiner.*